(12) United States Patent
Wilkinson

(10) Patent No.: US 7,831,127 B2
(45) Date of Patent: Nov. 9, 2010

(54) COMBINING VIDEO MATERIAL AND DATA

(75) Inventor: James Hedley Wilkinson, Hampshire (GB)

(73) Assignee: Sony United Kingdom Limited, Weybridge (GB)

( * ) Notice: Subject to any disclaimer, the term of this patent is extended or adjusted under 35 U.S.C. 154(b) by 1549 days.

(21) Appl. No.: 10/129,197

(22) PCT Filed: Sep. 4, 2001

(86) PCT No.: PCT/GB01/03967

§ 371 (c)(1),
(2), (4) Date: May 2, 2002

(87) PCT Pub. No.: WO02/21845

PCT Pub. Date: Mar. 14, 2002

(65) Prior Publication Data

US 2002/0164149 A1 Nov. 7, 2002

(30) Foreign Application Priority Data

Sep. 6, 2000 (GB) ................................. 0021882.6

(51) Int. Cl.
| | |
|---|---|
| *H04N 7/00* | (2006.01) |
| *H04N 5/00* | (2006.01) |
| *H04N 5/91* | (2006.01) |
| *H04N 5/445* | (2006.01) |
| *H04N 7/16* | (2006.01) |
| *H04N 7/26* | (2006.01) |
| *H04N 7/64* | (2006.01) |
| *H04N 7/173* | (2006.01) |
| *H04N 9/00* | (2006.01) |
| *H04N 9/79* | (2006.01) |
| *H04N 9/80* | (2006.01) |
| *H04N 11/02* | (2006.01) |
| *H04H 20/28* | (2008.01) |
| *H04J 3/22* | (2006.01) |
| *H04J 3/24* | (2006.01) |
| *H04L 12/56* | (2006.01) |
| *G11B 5/09* | (2006.01) |

(52) U.S. Cl. .................. 386/46; 389/6; 389/7; 389/8; 389/12; 389/27; 386/27; 386/33; 386/39; 386/40; 386/45; 386/68; 386/81; 386/82; 386/96; 386/104; 386/105; 386/106; 386/109; 386/112; 386/116; 386/124; 386/125; 386/126; 345/629; 360/32; 370/395.1; 370/465; 370/468; 370/470; 370/471; 370/474; 370/476; 370/486; 370/487; 725/38; 725/61; 725/134; 725/142

(58) Field of Classification Search ............... 386/6, 386/7, 8, 12, 27, 33, 39, 40, 45, 46, 68, 81, 386/82, 96, 104, 105, 106, 109, 112, 116, 386/124, 125, 126; 345/629; 360/32; 370/395.1, 370/472, 465, 474, 470, 476, 471, 468, 486, 370/487; 707/102, 104.1; 725/38, 61, 134, 725/142; 375/130, E1.025; 709/214, 206; 711/114; 714/E11.034

See application file for complete search history.

(56) References Cited

U.S. PATENT DOCUMENTS

| | | | |
|---|---|---|---|
| 4,445,151 A | 4/1984 | Kinoshita et al. | |
| 4,564,867 A | 1/1986 | Nakajima | |
| 5,765,164 A * | 6/1998 | Prasad et al. ............. | 707/104.1 |
| 5,778,139 A * | 7/1998 | Kim ........................... | 386/81 |
| 5,995,516 A | 11/1999 | Iwasaki et al. | |
| 6,047,317 A | 4/2000 | Bisdikian et al. | |
| 6,064,378 A | 5/2000 | Chaney et al. | |
| 6,133,956 A * | 10/2000 | Ludgate et al. .............. | 348/458 |
| 6,272,149 B1 * | 8/2001 | Fujisaki ....................... | 370/474 |
| 6,529,997 B1 * | 3/2003 | Debiez et al. ............... | 711/114 |
| 6,731,305 B1 * | 5/2004 | Park et al. ................... | 345/629 |
| 6,782,036 B1 * | 8/2004 | Dowling et al. ............. | 375/130 |
| 6,792,433 B2 * | 9/2004 | Cornog et al. ........... | 707/104.1 |
| 6,856,759 B1 * | 2/2005 | Fukuda et al. ................. | 386/96 |
| 7,240,100 B1 * | 7/2007 | Wein et al. ................... | 709/214 |
| 2002/0138582 A1 * | 9/2002 | Chandra et al. .............. | 709/206 |
| 2003/0093790 A1 * | 5/2003 | Logan et al. .................. | 725/38 |

FOREIGN PATENT DOCUMENTS

EP 0 509 390 A1 10/1992

| EP | 0 710 022 A2 | 5/1996 |
| EP | 0 827 147 A2 | 3/1998 |
| EP | 0 980 185 A1 | 2/2000 |
| EP | 0 991 278 A2 | 4/2000 |
| EP | 1 005 230 A2 | 5/2000 |
| GB | 2 269 509 A | 2/1994 |
| JP | 2001-157179 * | 11/1999 |
| WO | 94/07332 | 3/1994 |
| WO | 98/03017 | 1/1998 |
| WO | 00/46989 | 8/2000 |

OTHER PUBLICATIONS

Material Exchange Forum, Pro-MPEG Forum, 1999.*
Wilkinson, J., "A Tutorial on SDTI-CP," SMPTE Journal, vol. 109, No. 3, Mar. 2000, pp. 205-210.
Wilkinson, J., "The SMPTE Data Coding Protocol and Dictionaries," SMPTE Journal, vol. 109, No. 7, Jul. 2000, pp. 579-586.

* cited by examiner

*Primary Examiner*—Thai Tran
*Assistant Examiner*—Syed Y Hasan
(74) *Attorney, Agent, or Firm*—Oblon, Spivak, McClelland, Maier & Neustadt, L.L.P.

(57) ABSTRACT

A method of combining data with other material comprises the step of repetitively distributing the data in the other material. The data is for example metadata associated with the other material. The other material may be one or more of video, audio and data material preferably in a defined file format e.g. MXF. The material and data from the file are preferably mapped to one of several signal interfaces such as SDI, SDTI and AES3, where the file metadata is repetitively distributed through the stream signal interface by one of several multiplexing methods.

41 Claims, 11 Drawing Sheets

THREE-LEVEL KLV DATA CONSTRUCT OF THE HEADER METADATA

ARRANGEMENT OF SYSTEM, PICTURE, AUDIO AND AUXILIARY ITEMS IN A CONTENT PACKAGE ON SDTI

CONTENT PACKAGE STRUCTURE

STRUCTURE OF ELEMENT DATA BLOCK

MXF FILES AND STREAMING FORMATS

COMBINING VIDEO MATERIAL AND DATA

The present invention relates to a method and apparatus for combining data with other material. The present invention also relates to a signal processing apparatus arranged to carry out the method, a digital bitstream and a computer program product.

'Material' means any one or more of video, audio, and data essence.

Embodiments of the invention relate to combining metadata with material. Preferred embodiments of the invention relate to combining metadata with video and audio material and the invention and its background will be discussed by way of example, and for greater clarity, with reference to such preferred embodiments but the invention is not limited to that.

Metadata is information associated with material such as video and audio. Some types of metadata describe the form of encoding of e.g. a compressed video signal to assist in the decoding thereof. Other types of metadata describe the content of the video. For example such descriptive metadata may include the title of the video and other information such as when and where the video was shot. Yet other types of metadata are technical information such as aspect ratio, lens used, video format etc. Yet further types include information such as Good Shot Markers, copyright information, and information about people appearing in the video. Many other types of data may be metadata.

A prior proposal suggested that metadata is stored separately from the material with which it is associated. The metadata may be stored in a data base and some means of linking it with the material is provided. Such means could be e.g. a code on a video-cassette. If the link is lost then the metadata cannot be associated with the material. If the database is destroyed then the metadata is lost. Thus it is desirable to combine at least some metadata with the material.

It is necessary to store material in a store such as a digital video tape recorder (DVTR) or a digital disc recorder. It is also desirable to repeat metadata so that it can be accessed more easily in e.g. a tape record without needing to spool back to the beginning of the tape. However most DVTRs and disc recorders have a data format which does not provide data space dedicated to metadata repeated at regular intervals in the digital bitstream.

According to one aspect of the present invention, there is provided a method of combining digital data with other digital material comprising the steps of:
structuring the digital data into a data structure having a key field, a length field and a value field, the value field containing the data;
creating a digital bitstream having a predetermined repetitive format compatible with a data recorder each repetition of the format including at least one data space for the other material and a data space for other data; and
repetitively including the data structure over a plurality of repetitions of the format, the data structure being included in the said other data space or in part of the data space of the other material.

By including the data structure in the format, the data structure can be accommodated in the format of the data recorder. The repetition allows the data structure to be accessed without the need to return to, e.g., the beginning of a tape if the recorder is a tape recorder.

A further step of the method optionally comprises the step of mapping the combined data and other material into a file in which the data structure is contained in one part of the file and the other material is contained in another part of the file.

Preferably the file comprises a file header, a file body containing the other material and a file footer. Most preferably the file is an MXF file and the data is Header Metadata thereof.

Preferably the file comprises a file header, a file body containing the said other material and a file footer. Most preferably the file is an MXF file and the data is Header Metadata thereof.

Material, especially video and audio, may be stored in various different types of store including tape recorders and file servers and transferred between them. Thus by organising the combined data and other material as a file the transfer is facilitated.

The format may that of an SDI bitstream or that of a Serial Data Transport Interface (SDTI) bitstream, the other material comprising at least video material which is uncompressed in the case of SDI and compressed in the case of SDTI. The compressed video material is contained in a picture item of an SDTI bitstream. Both formats are based on video frames.

Both formats may include audio frames, which can operate in audio and in non-audio mode. In an embodiment of the invention, the data structure is included in audio frames operating in non-audio mode.

SDI has a Vertical Ancillary Data (VANC) space. In an embodiment of the invention, the data structure is included in the VANC space.

In SDTI, the VANC is included in the picture item data space. In an embodiment of the invention, the data structure is included in the VANC space.

SDTI also has a system item. In an embodiment of the invention, the said data structure is included in the system item.

In preferred embodiments the data structure is encoded in a group of packets called a packet set. Each set includes an integer number of whole packets where the integer number includes one. The packets include integer numbers of whole KLV encoded items containing the data of the structure where a value field V contains the data, a length field indicates the length of the value field and a key field indicates the type of packet.

In SDI, one packet set preferably occupies one Vertical Blanking Interval (VBI) video line in the VANC space. The packet may be null-terminated to occupy one VBI line.

In SDI, each repetition preferably begins in a new frame, and in a new packet in a new packet set.

In SDTI, one packet set preferably occupies one uncompressed video line in the VANC space. The packet set may be null terminated to occupy one whole line.

Alternatively, in SDI and in SDTI, one packet set preferably occupies one audio frame operating in non-audio mode. The packet may be null—terminated to occupy one whole audio frame.

Alternatively, in SDTI-CP, one packet set preferably occupies the metadata area of the system item data space.

A further aspect of the invention provides a computer program product containing program instructions which when run on a suitable signal or data processor implement the method of said one aspect of the invention.

Other aspects of the invention are specified in the claims to which attention is invited.

For a better understanding of the present invention, reference will now be made by way of example to the accompanying drawings in which.

Figure 4:
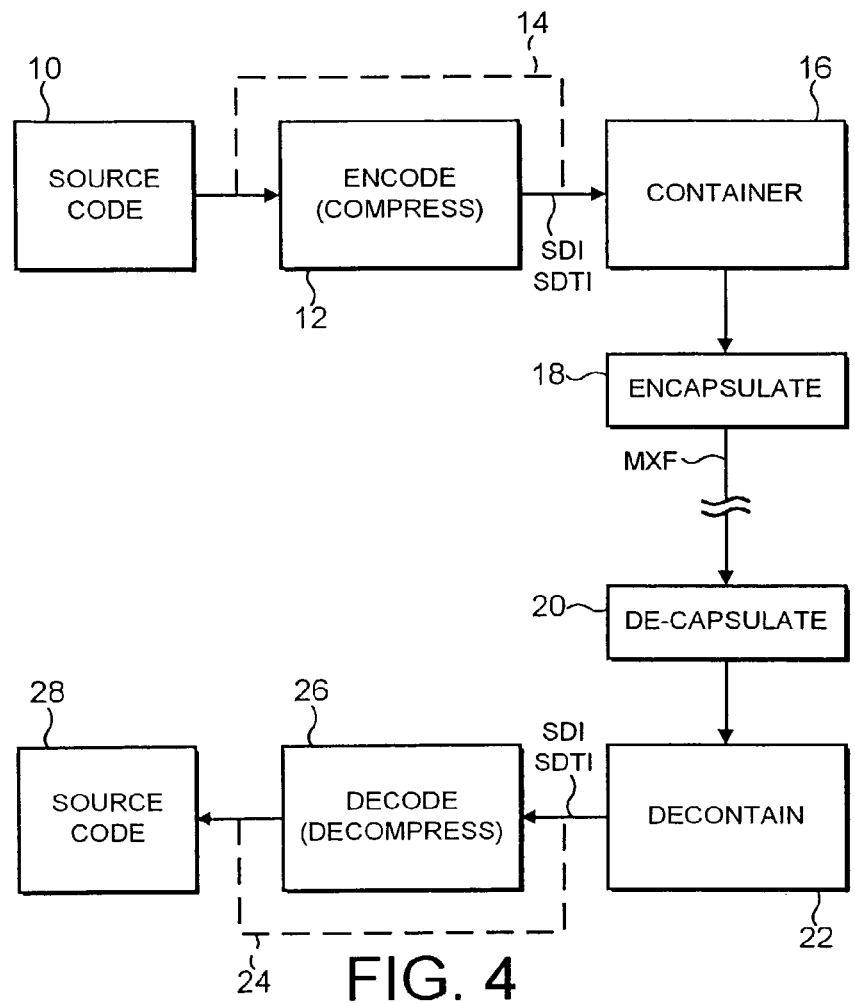
Figure 5:
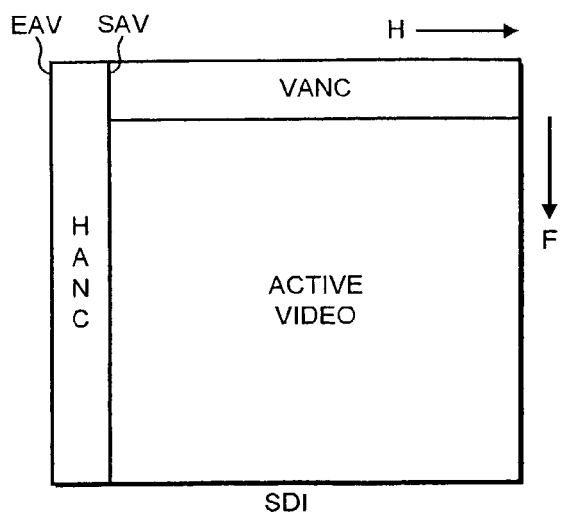
Figure 6:
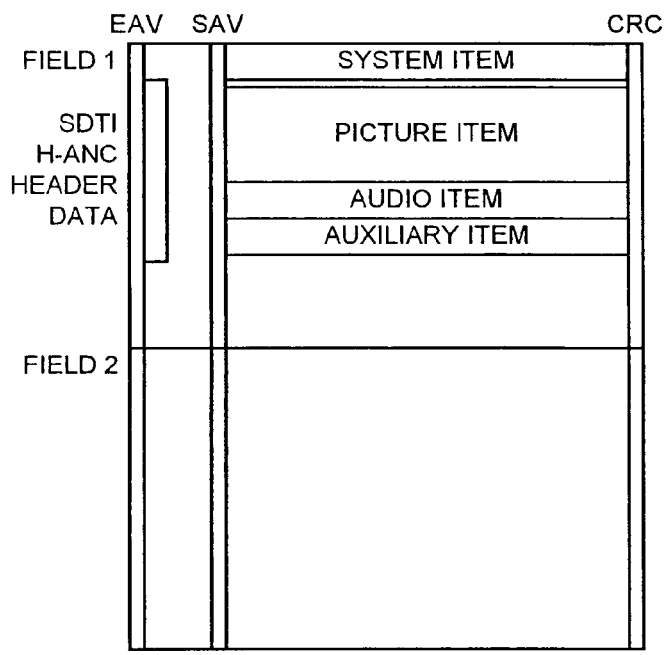
Figure 7:
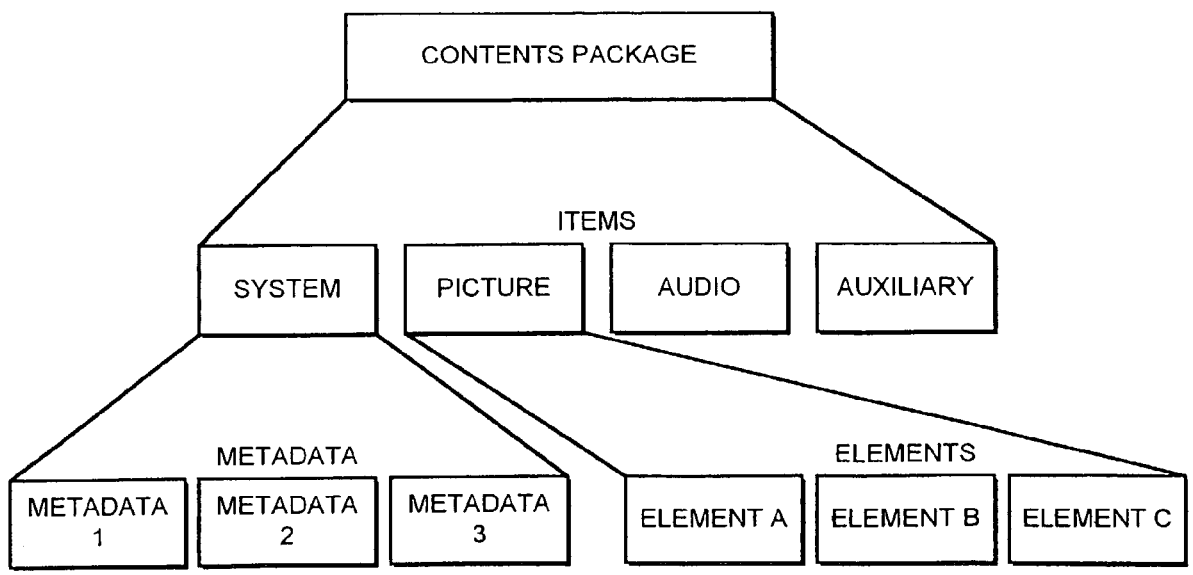
Figure 8:
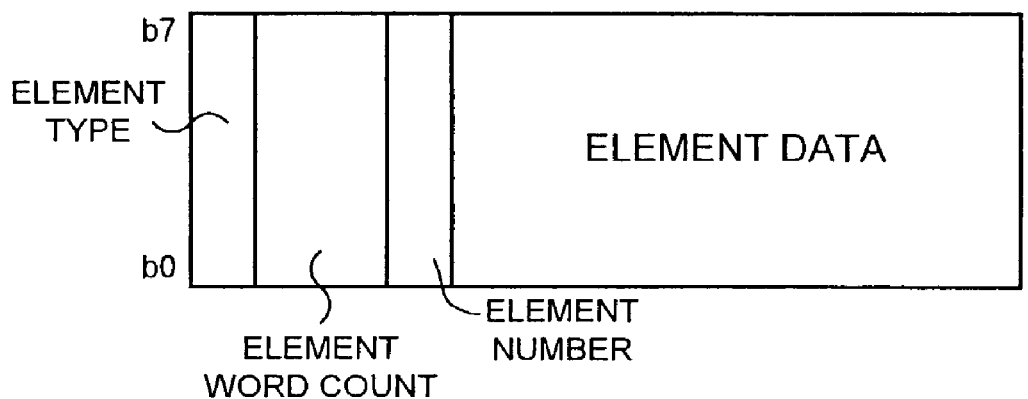
Figure 9:
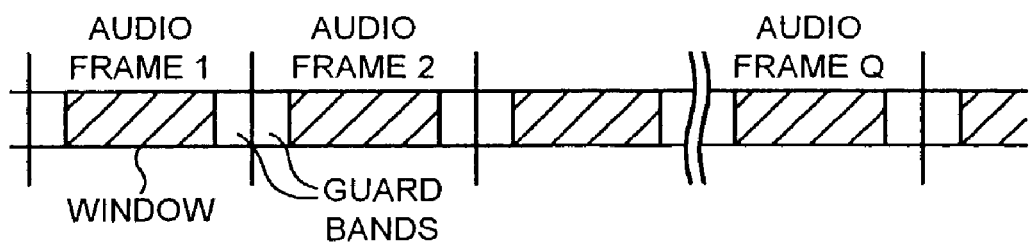
Figure 10:
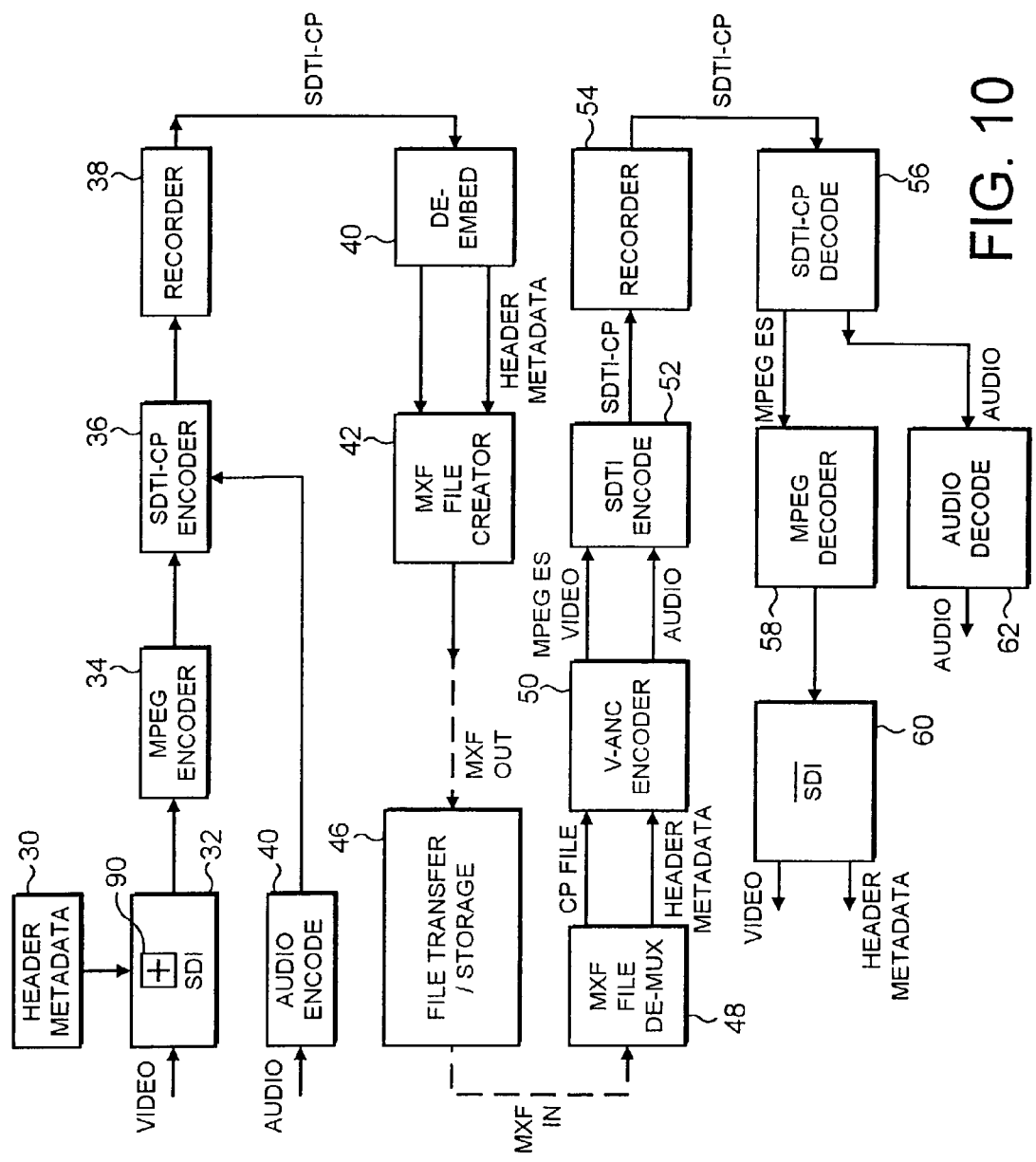
Figure 11:
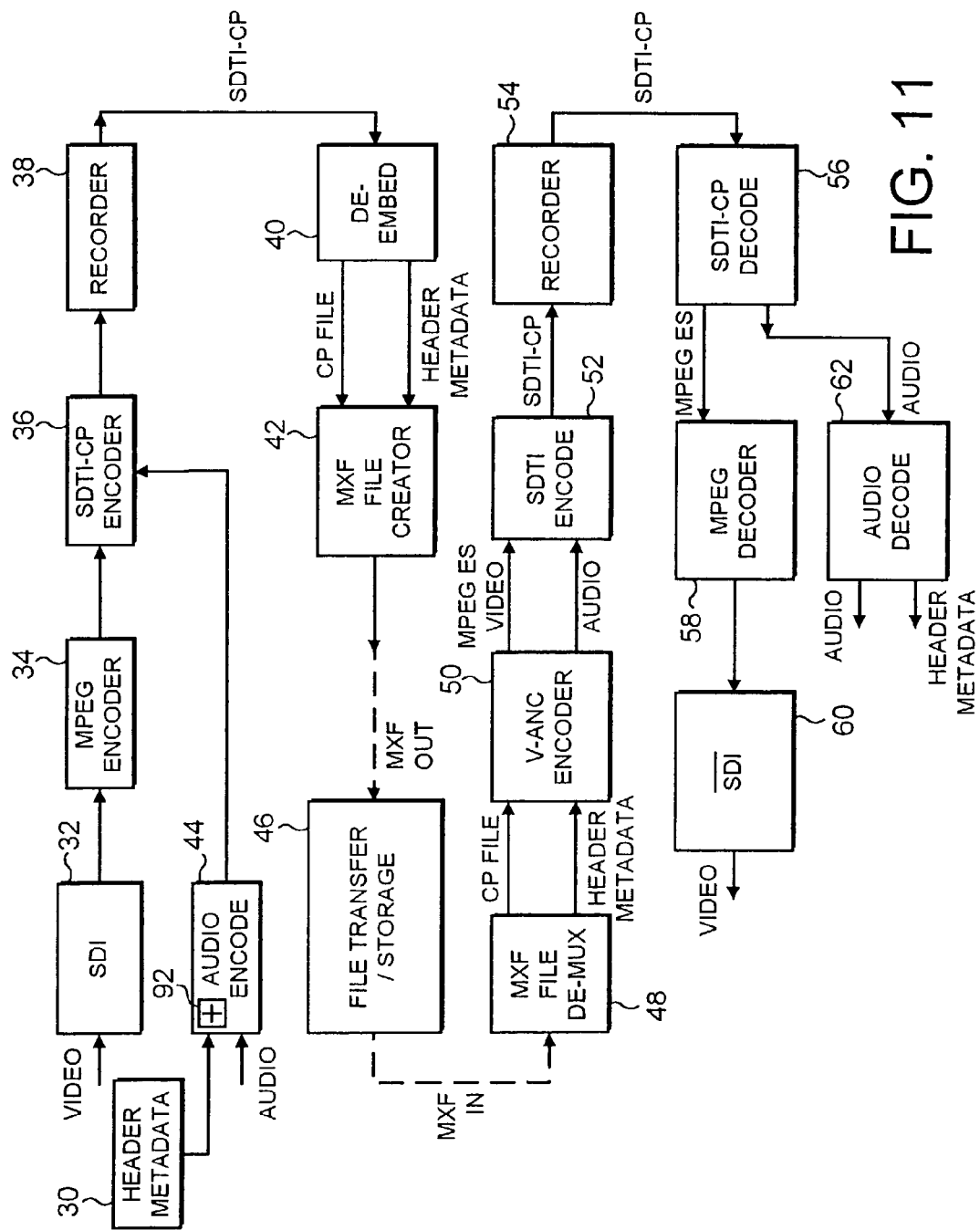
Figure 12:
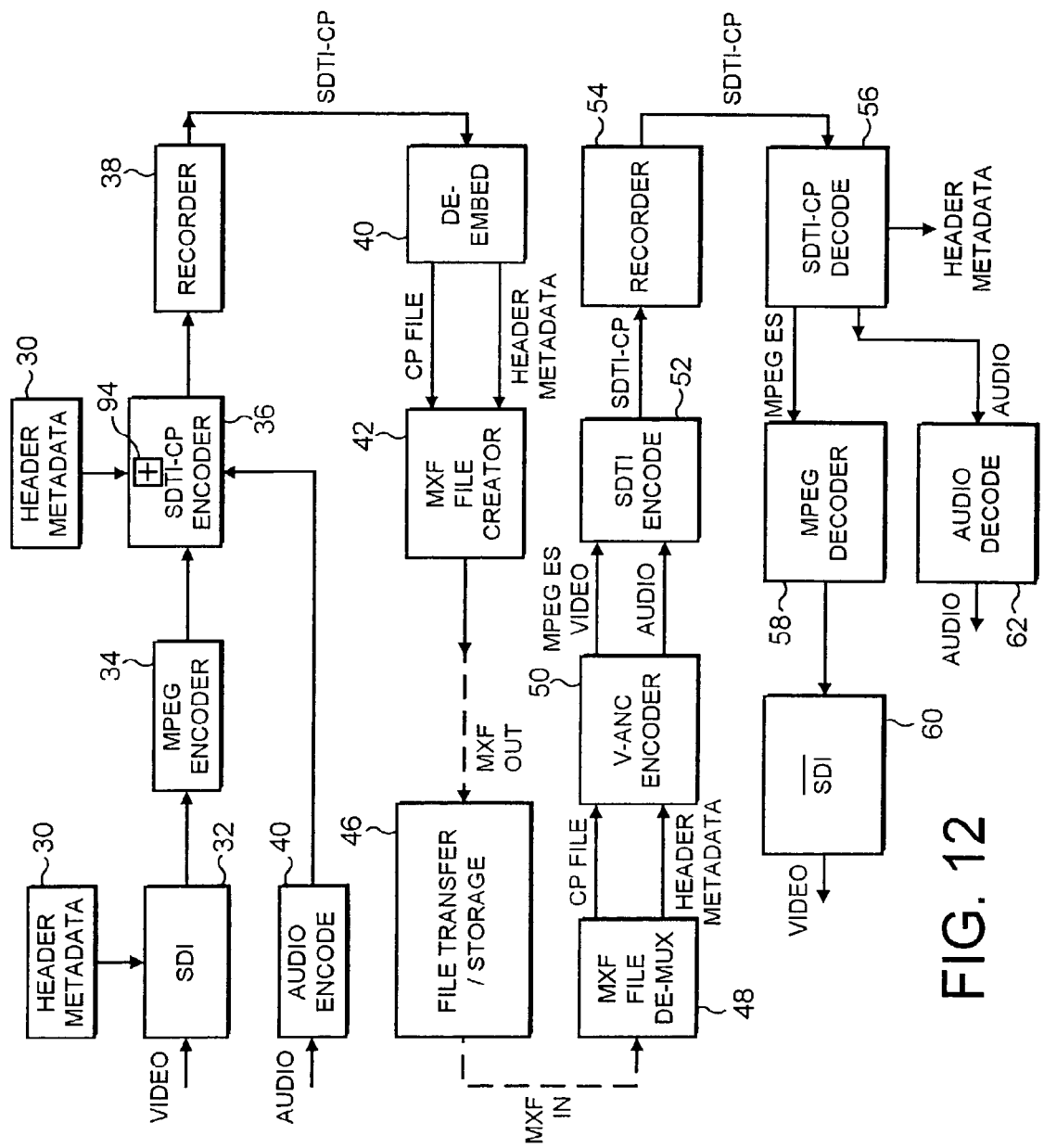
Figure 13:
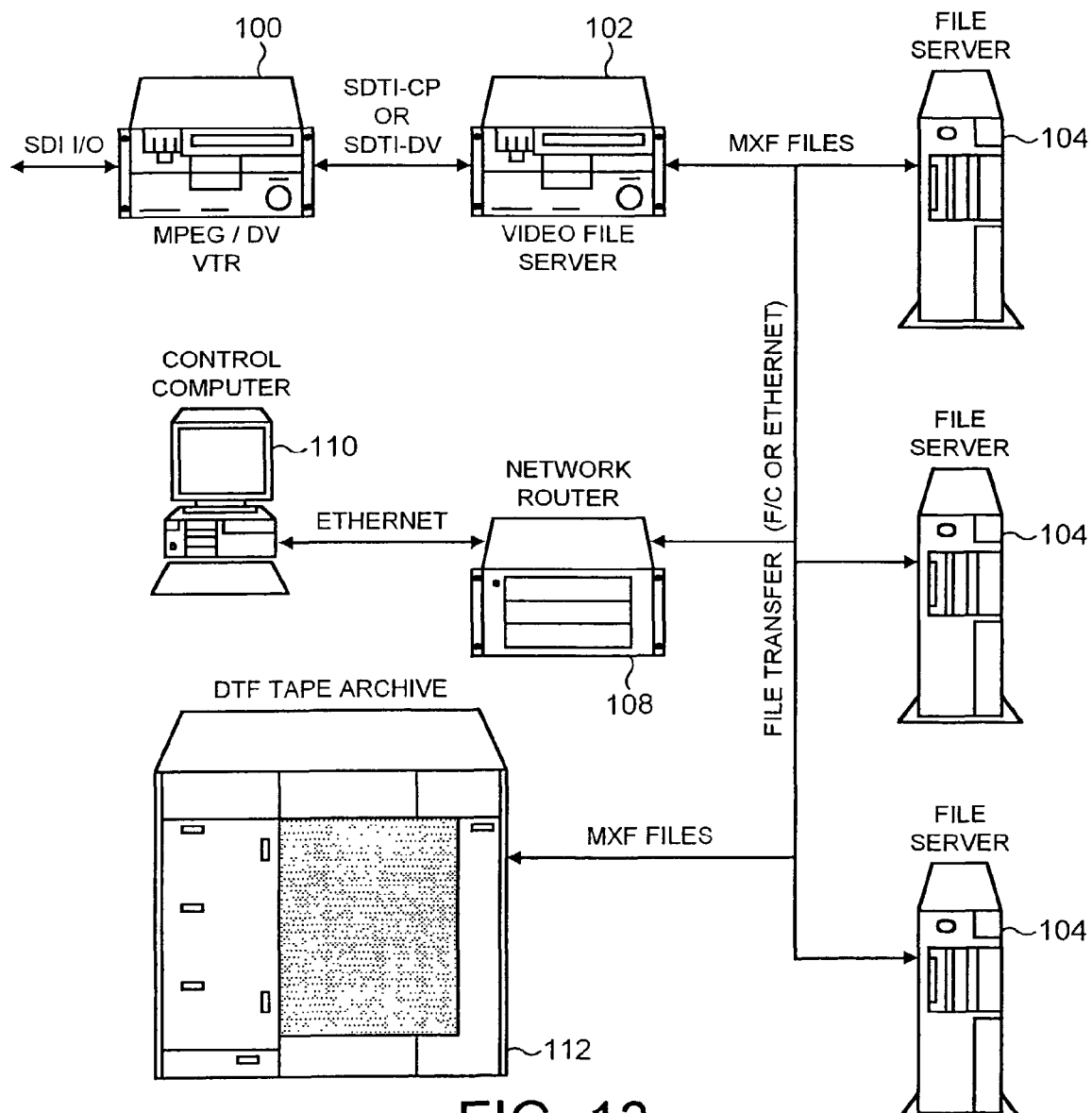
Figure 14:
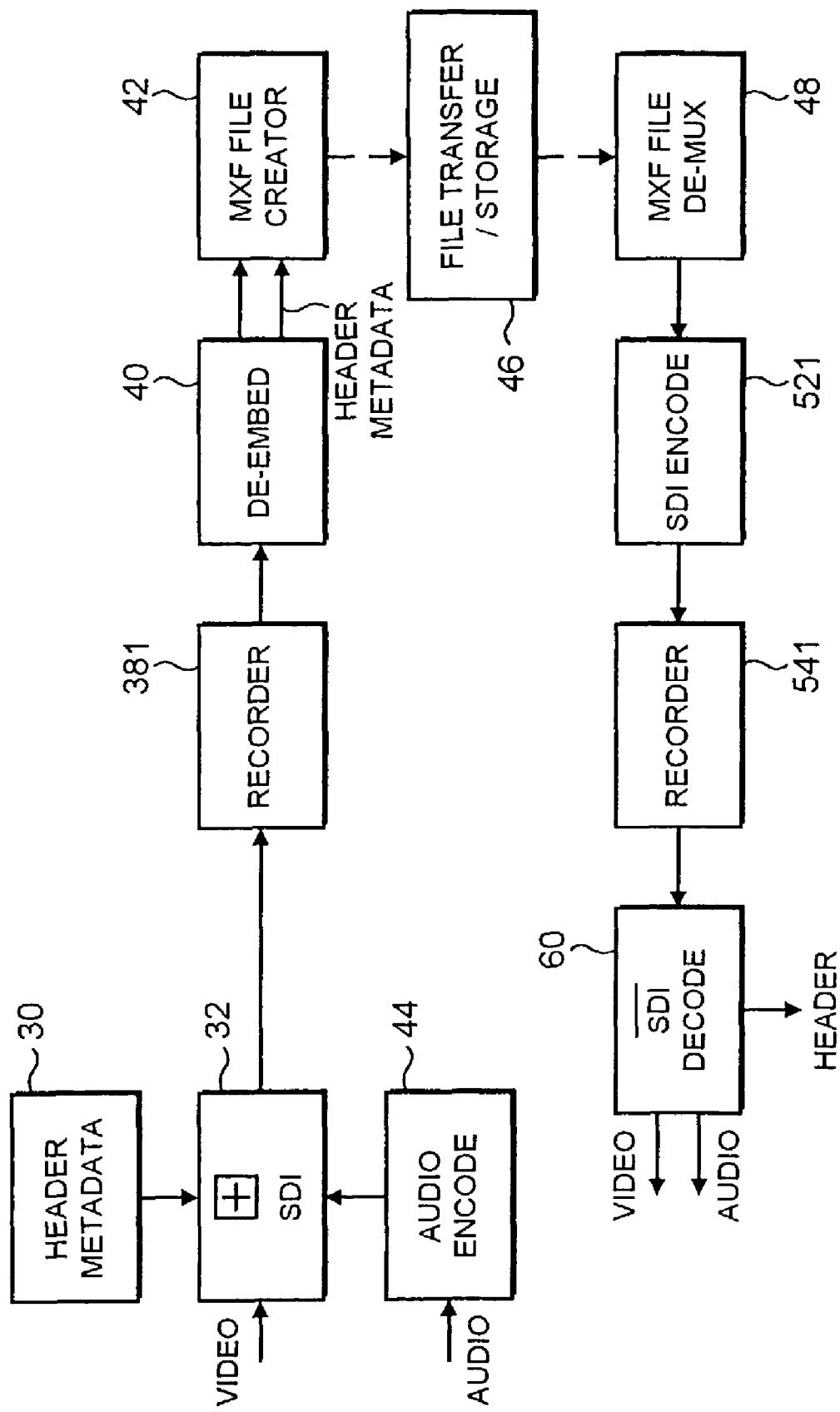

FIGS. 3A to D are schematic diagrams showing the mapping of header metadata over a packet stream;

FIG. 4 is a schematic block diagram of a signal processing and material transfer system;

FIG. 5 is a schematic diagram of an SDI field;

FIG. 6 is a schematic diagram of an SDTI-CP frame;

FIG. 7 is a model of the data structure of SDTI-CP content package;

FIG. 8 is a model of an element used in an SDTI-CP content package;

FIG. 9 is a schematic diagram showing audio packets;

FIGS. 10 to 12 are schematic block diagrams of illustrative systems for implementing the system of FIG. 4;

FIG. 13 illustrates a network showing the video and audio material streamed over SDI/SDTI interfaces together with file transfer over a computer network interface; and FIG. 14 illustrates an alternative system for implementing the system of FIG. 4.

MXF FILE

Figure 1:
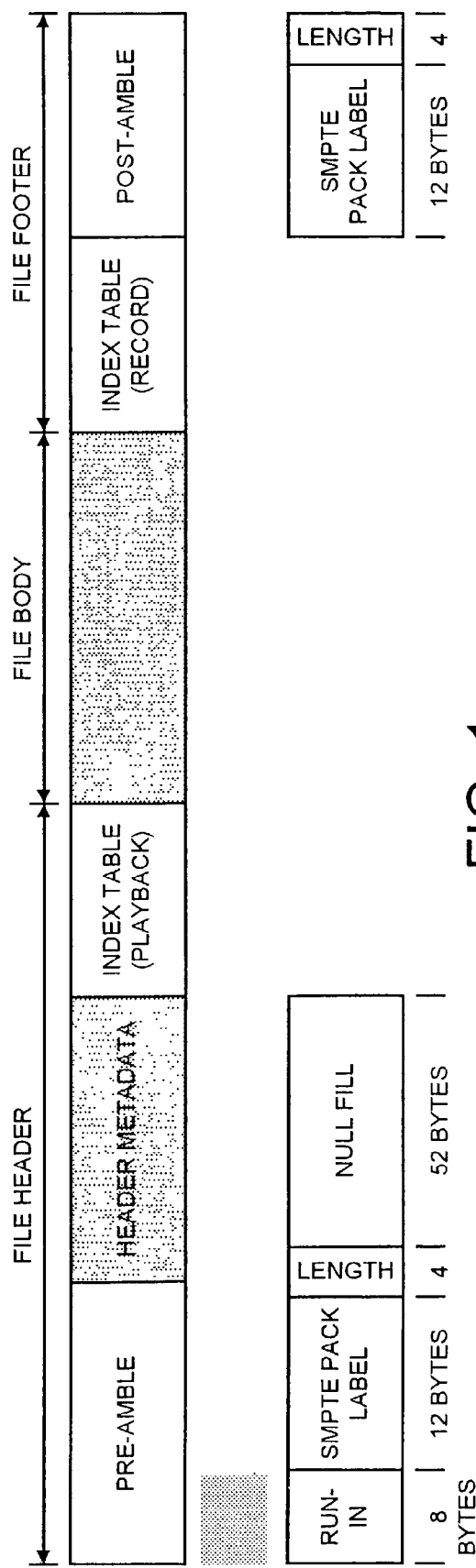
FIG. 1 is a schematic diagram of the overall data structure of an MXF file.

Referring to FIG. 1, there is shown the overall data structure of a file. Such a file is referred to herein as an MXF file (Material eXchange Format). The purpose of the Material Exchange Format is to exchange programme material together with attached metadata information about the material body. The MXF file is intended for the transfer of programme material and metadata between disc-based file servers for example.

MXF files are defined by a sequence of Key, Length, Value (KLV) coded data packets.

Header Metadata is structured as follows:

Individual metadata items coded with KLV,

Logical groupings of metadata items coded as metadata sets coded by KLV where the Value is a collection of KLV coded metadata items, and Logical groupings of metadata sets coded by KLV where the value is a collection of KLV coded metadata sets;

where the top level is the Header Metadata at the outermost level.

The file comprises a file header, a file body and a file footer. The body contains the "essence" that is, in this example, video and/or audio essence data. The essence may alternatively be, or additionally include, essence data. The following description refers only to video and audio for convenience of description.

It will be appreciated that FIG. 1 is not drawn to scale. The body is much greater than the preamble and post amble. The body may contain 99% or more of the total data content of the file.

The File Header

The file header contains a Preamble followed by Header Metadata. and optionally an index table.

The Pre-amble preferably starts with a fixed Run-in byte sequence of e.g. 8 bytes. That is followed by Key, Length Value (KLV) encoded preamble data pack which comprises:

an SMPTE Pack label of 12 bytes (the Key);

followed by one or more Length bytes, (4 in this example); which is followed in this example by a null filled value field. The length byte indicates the amount of data in the value field.

The SMPTE pack label defines the File as an MXF file

The File Footer

The MXF file is terminated by a File Footer. The footer contains an optional index table followed by a Post-amble.

The Post amble comprises a KLV encoded post-amble data pack. The post-amble data pack comprises a SMPTE pack label of 12 bytes, and one or more length bytes (4 in this example). In this example there is no value field and the length byte indicates a length of zero. In some circumstances, a value may be in, or added to, the vale field but would be ignored by an MXF decoder.

The Index Table

The index table provides a means of rapidly locating specific data, e.g. video frame starts, in the file body.

The index table is an optional metadata set, which can be used to locate individual frames of video essence and related audio and data essence. Index files may be placed either immediately before the Body, immediately after the Body or optionally distributed throughout the Body.

An index table can be created 'on the fly' during file creation from a stream input and is notionally placed at the end of the file on recording. In practice, its placement in a server file system may be anywhere for storage convenience. During transfer of a complete file, the Index table is placed in the MXF file header.

Index tables are not necessary for body container specifications which are defined with a constant number of bytes per frame, so their inclusion in the MXF file is optional.

Header Metadata

The preamble comprises Header Metadata. The metadata may be any information associated with the essence contained in the file body. The metadata may be descriptive of the essence, be technical data relating to the essence or any other information.

By way of example only, descriptive metadata may comprise data relating to the production of video material such as Programme ID (PID), Title, Working Title, Genre ID, Synopsis, Director ID, Picturestamp, Keywords, Script, People, e.g. names and other details of performers and production crew.

By way of example technical metadata may comprise data such as display aspect ratio, picture dimensions in pixels, picture rate, camera type, lens identification, and any other technical data.

Metadata may also comprise data relating to edits in the material. It may comprise instructions defining simple editing and other processes to be performed on the material.

Figure 2:
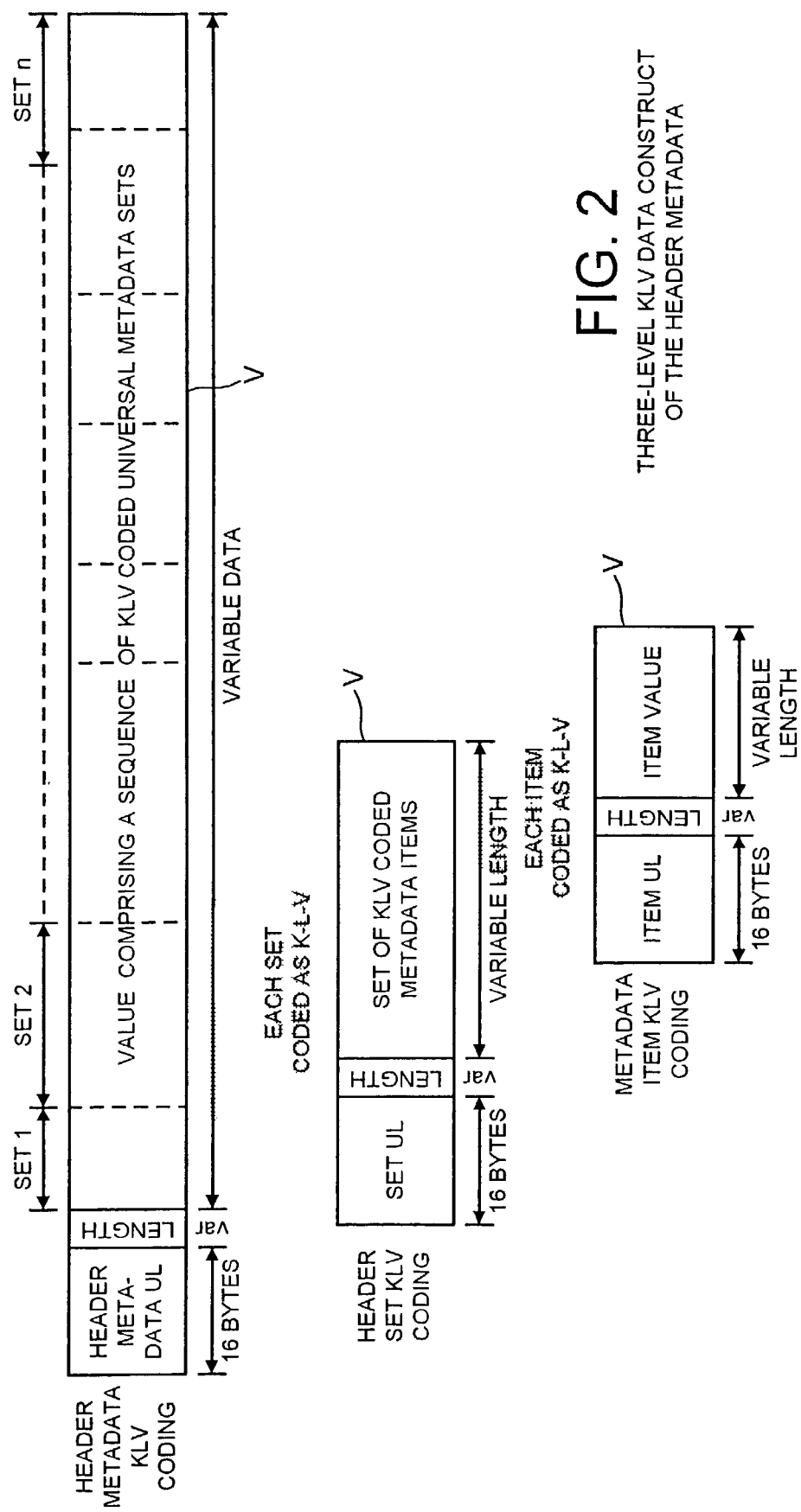
FIG. 2 is a schematic diagram showing the data construct of header metadata of FIG. 1.

Referring to FIG. 2, the Header Metadata of the preamble comprises 16 bytes of Header Metadata Universal Label (UL), followed by a length byte followed by KLV encoded metadata sets (sets 1 to n) which constitute the data of the value field (V).

The UL defines the data value (V) following the UL as MXF Header Metadata.

Each KLV encoded metadata set n comprises a set UL of 16 bytes, which uniquely identifies that set, one or more length bytes and a set of KLV coded metadata items constituting the data in the value field V of the set. The length byte indicates the length of the value field. The UL defines the complete list of metadata items present in the set n.

Each item is KLV encoded, comprising a 16 byte item UL, one or more length bytes and the data in the value field V. The UL defines the type of content in the value field.

It will be appreciated that a set n may itself contain a plurality of KLV encoded sets of data. An item may contain one or more sets of KLV encoded data.

The File Body

An example of a file body will be described below. The example is an SDTI-CP content package containing MPEG encoded video. Other containers may be used.

The contents of the file body depend on the video, and/or audio and/or data essence contained in it and the manner in which it is encoded. For example, video may be compressed or uncompressed. Several different forms of compression are possible.

Each essence frame is KLV encoded in the file body. In the case of an SDTI-CP content package, which contains different essence types, each type is separately KLV encoded.

Each container type has a unique and registered Universal Label UL as a Key in the KLV coding.

Each essence type within a container may have a unique key.

The amount of data in the file body is unlimited and bound only by the file header and file footer. The data in the file body could be for example many Gigabytes.

MXF Header Metadata Repetition

The Header Metadata may be repetitively distributed through the file body. The Header Metadata in the file body is additional to the Header Metadata in the preamble. This has the advantages that:

if a file is interrupted during a transfer recovery of metadata is possible; and an MXF file allows random access to data within the file body. The repetitive metadata allows easier and quicker access to metadata relating to randomly accessed data because it avoids the need to scroll to the beginning or end of the file.

Repetition of Header metadata in the file body is optional but has no connection with the repetition of metadata in accordance with embodiments of this invention.

The foregoing description sets out some of the basic features of MXF files. There are other features but they are not relevant to the present invention.

System Overview

Referring to FIG. 4, a signal processing and material transfer system comprises a source 10 of source code, an optional encoder 12, an interface which formats the source code or the encoded source code into a container 16 and an interface 18 which encapsulates the container into the body of an MXF file. The MXF file is transferred to an interface 20 which decapsulates the file; i.e. retrieves the container from the body. The source code or the encoded source code is retrieved from the container in an interface 22. If encoded the source code is decoded in a decoder 26. The source code may be utilised in an utiliser 28 which may be for example a display device or any other processor which operates on or requires source code.

The transfer from the interface 18 to the interface 20 may be by storage in a disc such as a computer data disc or transfer by a communications network using Internet Protocol Packets for example. Other means of transfer may be used including other networks for example Ethernet and Fibre Channel.

The encoder 14 may be a compression encoder such as an MPEG2 encoder. Other forms of compression may be used. The decoder 26 corresponds to the encoder.

The interface 20 is an MXF decoder which is able to decode at least the following of an MXF file:

the KLV container structure of all parts of the file (including the data structure of any kind of Body);

the Header, including the Header Metadata structure; and the Footer.

Stream Interface for Uncompressed Material

An example of a stream interface for uncompressed digital video and audio material is the Serial Digital Interface (or Interconnect) (SDI) defined in SMPTE 259M. SDI is well known in the art and so will not be described in detail herein. FIG. 5 is a schematic model of video and audio mapped onto the SDI structure. SDI uses interlaced fields. In FIG. 5, SAV denotes Start Active Video, EAV denoted End Active Video, H denotes line scan direction and F denotes vertical scan direction.

The SDI transport comprises a video frame in which data is carried in the lines of the frame. A field has essentially the same structure. The frame has a Vertical Blanking Interval (VBI) a Horizontal Blanking Interval and an active video space. In SDI, the VBI can be used for the carriage of Vertical Ancillary Data (VANC), and the Horizontal blanking interval can be used for the carriage of Horizontal Ancillary data (HANC). The active video space is the space for the main data, e.g. digital video. AES/EBU digital audio channels may be contained in the HANC as defined by SMPTE 272M. Such audio channels comprise audio frames, (which are explained in more detail below).

In accordance with illustrative examples of the invention, the VANC contains Header Metadata as described above.

In accordance with another embodiment Header Metadata may be mapped into audio frames of the audio channels. Each audio channel can carry either audio or non-audio data where the non-audio data can be any data such as metadata. Whether data in an audio frame is audio or non-audio data is indicated by a flag in known manner.

Stream Interface for Compressed Material

An example of a stream interface for compressed data such as MPEG2 is SDTI CP which is described in SMTPE 326M. FIG. 6 is a schematic diagram of an SDTI-CP frame having two fields. An SDTI-CP field does not accommodate vertical ancillary data VANC. The active video space contains lines allocated to "Items" System Item, Picture Item, Audio Item and Auxiliary Item. As shown in FIG. 7, the items contain one or more elements. Elements are shown in FIG. 7 in relation to the picture item as an example. An item comprises one or more elements. An element comprises one KLV encoded data block as shown in FIG. 8. Compressed video is contained in a picture element within the picture item. An SDTI data stream may be derived by mapping in known manner the data contained in an SDI data stream into an SDTI data stream, together with compression of the video.

An MPEG2 Elementary Stream (ES) may embed Vertical Ancillary Data within the elementary stream according to the SMPTE standard SMPTE 328M. If the SDTI CP stream is derived from SDI and VANC data exists, the VANC data is mapped into the MPEG2 ES Ancillary Data space. In accordance with embodiments of the invention, the VANC data is Header Metadata. The Ancillary Data space uses one or more uncompressed video lines. The use of uncompressed video lines for ancillary data reduces the data space (bandwidth) available for video.

An SDTI-CP audio item contains one or more audio elements which may contain 1 to 8 audio channels in each element. Each audio channel within an element can carry either audio or non-audio data where the non-audio data can be any data such as metadata. Whether data in an audio frame is audio or non-audio data is indicated by a flag in known manner. Header metadata may be mapped into audio frames in the audio item in accordance with an embodiment of the invention.

Mapping Header Metadata Over a Packet Stream

Figure 3:
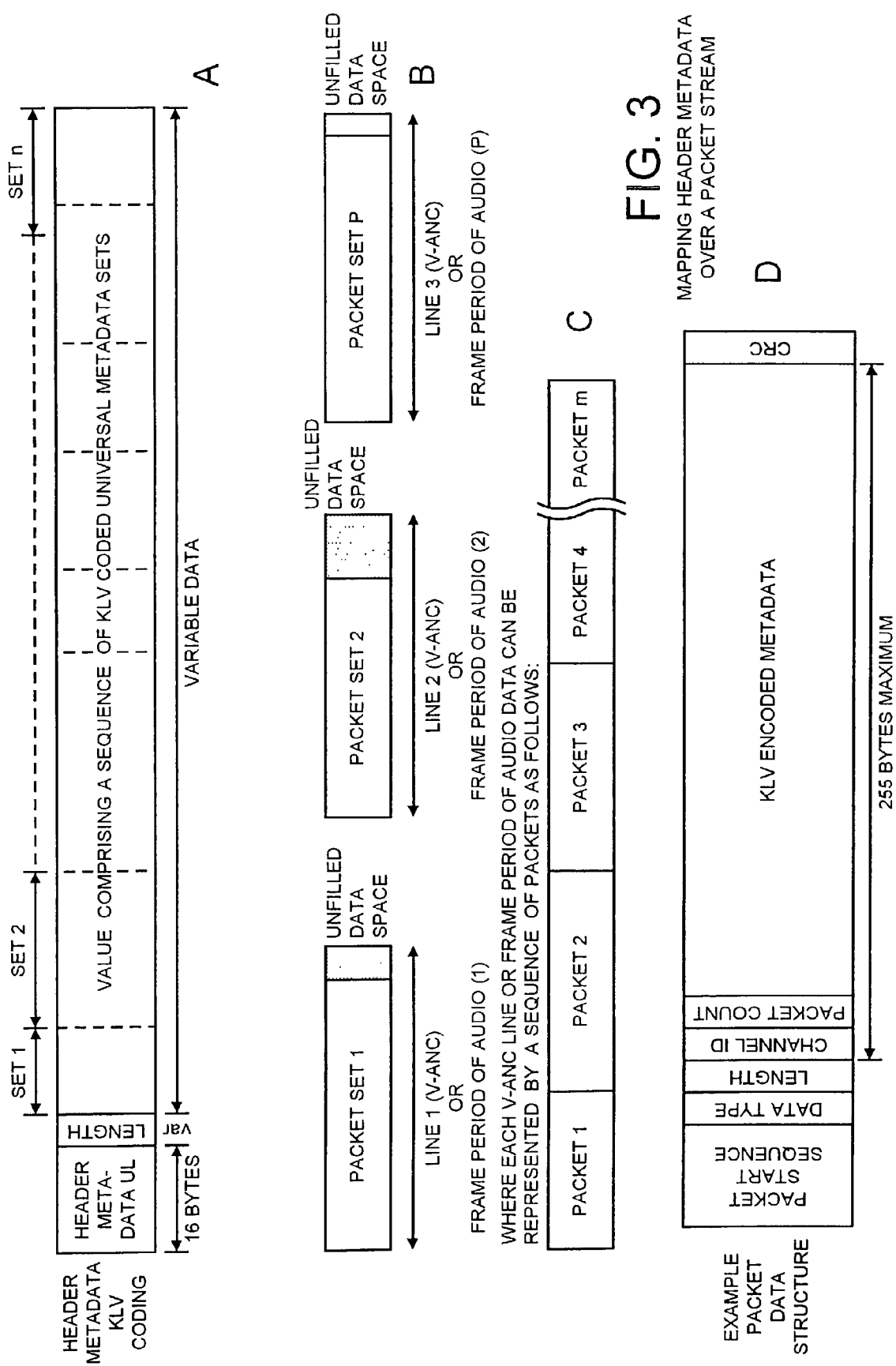

In accordance with embodiments of the invention, Header Metadata is organised as shown in FIG. 3.

Referring to FIG. 3A, the overall data structure of Header Metadata is shown as a single entity, and is exactly the same as shown in FIG. 2. The complete Header Metadata data structure is KLV encoded as shown in and described with reference to FIG. 2. It comprises the Universal Label (UL) of 16 bytes followed by one or more length bytes followed by $\underline{n}$ sets of metadata in the value field.

Referring to FIG. 3B, the complete data structure of FIG. 3A is distributed into $\underline{p}$ Packet Sets Referring to FIG. 3C, each Packet Set comprises $\underline{m}$ packets. As shown in FIG. 3D each packet is KLV encoded. Referring to FIG. 3D, a packet comprises a packet start sequence,
a data type byte,
a length byte,
a 1 byte channel ID,
a packet count of two bytes,
a set of complete metadata KLV blocks and
a CRC code.

The channel ID plus the packet count plus the KLV blocks contain a maximum of 255 bytes in this example.

The channel ID provides a means of interleaving many different channels of metadata relating to different channels of essence. The channel ID identifies the channel to which the metadata belongs.

Ideally, the value field of a packet contains a set of complete KLV encoded metadata items as shown in FIG. 2. However it is possible that an item has more than 252 bytes. In that case, the value field of the metadata item may be contained in more than one consecutive packet of a sequence of packets. The first packet of the sequence has a key, e.g. of 16 bytes, to allow the packets of the sequence to be identified and to maintain the continuity of the data of the metadata item.

The first packet in a frame, if it is part of a multi packet sequence, also has such a key.

The packet count identifies the packet number within the defined channel number. Typically, this count uses 2 bytes which allows a sequence of up to 65536 packets. Packet count '0' is always the first packet in the message. Thus for example the packet count begins with packet 0 in packet set $\underline{p}$=1 and continues incrementing throughout the p packet sets.

Mapping of Packets in Accordance with Embodiments of the Invention

The packets of Header Metadata are mapped, and embedded in an SDI or SDTI data stream, on a repetitive basis, as follows:

a) for uncompressed video over SDI, it is mapped into one or more VBI lines as VANC data;
b) for compressed bitstreams in SDTI, it is mapped into one or more compressed video frames of payload data space, being mapped into the ancillary data space such as may be provided by extensions to the MPEG2 ES syntax (as provided by the SMPTE standard SMPTE 328M); or
c) alternatively to a) and b), it is mapped into one or more audio frames of one or more audio channels, e.g. AES 3 channels operating in non-audio mode. Such channels exist in SDI, and in SDTI-CP.
d) The Header Metadata is padded to occupy an integer number of frames, so that when the Header Metadata is repeated it always starts in the same place on a new frame. By starting each complete data structure of Header Metadata on a new frame, break-up in editing operations is reduced or minimised.
e) The Header Metadata is packetised with a packet structure which includes at least the packet channel identification (the channel ID) for multiplexing with other packetised metadata, and the packet sequence count (so detection of the first packet is easy)
f) each repetition of a complete Header Metadata data structure starts in a new packet, preferably packet 0, for ease of data parsing
g) Referring to FIG. 9, when mapping Header Metadata into AES3 non-audio frames, the Metadata is mapped into a window spaced from the beginning and end of the audio frame by guard bands to increase reliability in the presence of timing errors or edits. The guard bands are null-filled.

An audio frame is the amount of audio data which occurs in the time interval of a video frame. For example, if analogue audio is sample at 48 KHz, and the video frame rate is 25 Hz, then an audio frame consists of 48000/25 bytes=1920 bytes.

Referring to FIG. 3B:—

In SDI, the packet sets 1 to $\underline{p}$ are assigned to respective VBI lines in SDI and most preferably only two lines of VBI are used per SDI frame, (i.e. one line per field) although more than two lines per frame could be used;

b) In SDTI, the packet sets 1 to p are allocated to the ancillary data space within an MPEG2 ES data stream;

c) Alternatively, in SDI and in SDTI the packet sets 1 to p are allocated to respective audio frames. Preferably one audio frame contains only one packet set.

Each packet set preferably occupies a whole SDI VBI line or audio frame with one packet set per line or per audio frame. Any spare data space on the line or in the audio frame is null filled. One line or one audio frame typically contains about 1400 bytes in examples of the invention, that is about m=5 packets using V-ANC as shown in FIG. 3C. Because one complete Header Metadata data structure is likely to be much greater than the data space available in one frame, it is spread over many packet sets 1 to $\underline{p}$. For that purpose, the packet count is used sequentially to identify all the packets over which it is spread and which contain one complete Header Metadata data structure. Because any spare space in a packet set in any frame is null-filled then the complete Header Metadata data structure occupies an integer number of frames. Once a complete Header Metadata data structure has been distributed over one group of $\underline{p}$ packet sets it is repeated in the succeeding group of $\underline{p}$ packet sets.

The repeat of the complete Header Metadata data structure begins in a new frame with packet 0 in packet set 1.

Several different complete Header Metadata data structures may be interleaved in respective channels identified by the channel IDs.

In summary, a complete Header Metadata data structure is distributed over an integer number of packet sets. Each packet set has an integer number of packets. Preferably, one packet set occupies only one VBI line in SDI or one audio frame; any data space not used on the line or in the frame is null-filled. Each repeat of a complete Header Metadata data structure begins on a new video or audio frame in a new packet of preferably preset number such as packet 0. This allows each complete Header Metadata data structure to be easily identified and its start position is easily found because it is consistently aligned with the video frames in SDI or with the audio frames in SDI and SDTI.

In SDTI where the Header Metadata is embedded in an MPEG2 ES data stream in an SDTI picture item, the packets are contained in Ancillary data lines in accordance with SMPTE 328M.

Illustrative Implementations of the Invention

FIGS. 10 to 12 are schematic block diagrams of illustrative systems for implementing the system of FIG. 4, with the repetition of Header Metadata in accordance with the invention. In FIGS. 10 to 12 like blocks are denoted by like reference numerals. The following descriptions of FIGS. 10 and 12 ignore the audio channel because it is not used in the embodiments of FIGS. 10 and 12 for containing Header Metadata.

In FIG. 10, Header Metadata is created in a metadata creator 30. The header metadata has the data structure shown in FIG. 2 and that metadata structure is mapped into the packets shown in FIG. 3 As described above in the section "Mapping of Packets in accordance with embodiments of the invention", the Header Metadata is inserted into the VANC of an SDI data structure using a suitable multiplexer 90 in an SDI interface 32 and the Header Metadata is repeated, each repeat beginning in a new packet (packet m=0) at the beginning of a VBI line in a new frame, each complete Header Metadata data structure occupying a integer number of frames. Preferably as described above one frame contains only one whole packet set p on one VBI line.

The SDI data structure contains uncompressed digital video in its active video data space. An MPEG encoder 34 compresses the digital video into an MPEG2 ES elementary stream and maps the SDI VANC containing the Header Metadata into the ancillary data space of the elementary stream.

An SDTI-CP interface maps the MPEG2 ES, containing the repeated Header Metadata, into the picture item of an SDTI-CP content package. There is no predetermined position or timing of the Header Metadata in the picture item of the SDTI-CP content package.

A digital data store such as a digital video tape recorder or digital disc recorder 38 which is designed to store SDTI-CP content packages records the SDTI-CP content package. Because the Header Metadata is in the MPEG2 ES contained in the picture item, the recorder 38 is able to store the repeated metadata without violating its formatting rules.

The video and the header Metadata may need to be transferred to a computer network and/or computer file storage denoted schematically at 46. For that purpose it is converted to an MXF file in this illustrative embodiment. The SDTI-CP bitstream is reproduced by the recorder 38 and fed to a de-embedder 40. The de-embeddder 40 separates the Header Metadata from the compressed MPEG2 ES of the SDTI-CP content package and supplies them to an MXF file creator 42. Assuming the SDTI CP bitstream contains only one Header Metadata structure and its repeats, the de-embeddder preferably supplies only one complete Header Metadata data structure (and no repetitions of it) to the creator 42. The MXF creator 42 maps the Header metadata into the file header of the MXF file and the MPEG2 ES stream into the file body of the MXF file as shown in FIG. 2.

The MXF file may be transferred to the network and/or computer file storage denoted schematically at 46. The MXF file may be transferred from the network and/or storage 46 to a recorder 54, which may be identical to the recorder 38. The MXF file is fed to a demultiplexer 48, which separates the Header Metadata from the file body of the MXF file. The compressed MPEG2 ES stream of the file body and the Header Metadata are fed to respective inputs of an encoder 50 which repetitively embeds the Header Metadata into the ancillary data space of the MPEG2 ES stream which is then embedded in the picture item of an SDTI-CP content package by an SDTI interface 52. The SDTI-CP bitstream is recorded in the recorder 54. The SDTI-CP bitstream may be reproduced by the recorder 54 and fed to an SDTI decoder 56, which outputs the MPEG2 ES stream containing the repeated Header Metadata in its ancillary data space. The video is decompressed by an MPEG2 decoder 58 and the Header metadata is mapped into the VBI of an SDI stream and the decompressed video is mapped into the active video space of the SDI stream. The decompressed video and the Header Metadata may be derived from an SDI interface 60.

The embodiment of FIG. 11 uses an audio channel to contain header metadata. Referring to FIG. 11, Header Metadata is created in a metadata creator 30. The header metadata has the data structure shown in FIGS. 2 and 3. The Header Metadata is inserted into audio frames as shown in FIG. 8 using a suitable multiplexer 92 in an audio interface 44 and the Header Metadata is repeated, each repeat beginning in a new packet (packet m=0) at the beginning of a a new frame, each complete Header Metadata data structure occupying a integer number of frames. Preferably as described above one frame contains only one whole packet set p where each packet set contains only one packet.

The SDI bitstream contains uncompressed digital video in its active video data space. An MPEG encoder 34 compresses the digital video into an MPEG2 ES elementary stream.

An SDTI-CP interface 36 maps the MPEG2 ES, into the picture item of an SDTI-CP content package. The audio containing the repeated Header Metadata is mapped into the audio item of the SDTI-CP content package.

The blocks 38 to 48 of the embodiment of FIG. 11 operate in the same way as discussed with reference to FIG. 10.

The encoder 50 embeds the header metadata repetitively into audio frames and an SDTI-CP encoder 52 maps the audio frames to the audio item of an SDTI-CP content package and maps the compressed video to the picture item. The SDTI-CP bitstream is recorded in recorder 54 reproduced and decoded in a decoder 56, which separates the audio from the MPEG2 ES stream. An audio decoder 62 separates and outputs the Header Metadata and audio.

The embodiment of FIG. 12 operates in much the same way as that of FIG. 10 except that the Header Metadata produced by creator 30 is embedded using a multiplexer 94 of an SDTI encoder 36 in the system item (shown in FIG. 6) of an SDTI-CP content package. Referring to FIG. 6, the Header UL of the Header Metadata follows immediately after the SAV in the system item. Blocks 38 to 54 operate as described with reference to FIG. 10. The SDTI decoder 56 separates the Header Metadata from the system item.

Those skilled in the art will recognise that, at the priority date of this patent application, whilst SDTI with system items is allowed in the relevant SMPTE standards, many data recorders, as exemplified by 38 and 54, do not yet support the use of system items.

Illustrative Network

FIG. 13 illustrates a network which uses streaming format signals such as SDI and SDTI and MXF files. An SDI bitstream is supplied to an MPEG digital video tape recorder 100. The recorder 100 MPEG encodes the video (and audio) components of the SDI bitstream and records the encoded components. The recorder in this example outputs an SDTI-CP or SDTI-DV bitstream containing the encoded components for transfer to a video file server 102 which records streaming format signals. The server 102 has an interface which produces MXF files and delivers MXF files to a computer network 106 having file servers 104, a router 108, a control computer 110 and a Tape archive 112. The MXF file allows exchange of material between the file servers 104, the archive 112 and the video file server 102.

Header metadata is mapped into the SDI and SDTI bitsreams as described above. The MXF files are produced by the server 102 as described above.

Modifications

Embodiments of the invention have been described above with reference to MPEG2 compression systems. Any other compression systems may be used.

Embodiments of the invention have been described above with reference to MXF files. Other types of file may be used provided the Header Metadata repeated as described above can be mapped into the file.

Embodiments of the invention have been described above with reference to SDI and SDTI. Other formats can be used provided the Header Metadata can be packetised, repeated and mapped into video or audio frames as described above.

FIGS. 10 to 12 show mapping of SDI into SDTI followed by mapping of SDTI into an MXF file. In alternative embodiments, SDI is mapped directly into an MXF file, the file body containing uncompressed video. The Header Metadata is contained in audio frames or in the VBI lines in the file body. Thus referring to FIG. 14 Header Metadata is created by a creator 30. Audio is encoded by an encoder 44. An SDI encoder 32 inserts uncompressed video into the active data space. The header Metadata is inserted into either audio frames operating in non-audio mode or into the VBI as described above. The metadata is repetitively distributed over the SDI video frames in the VBI or in the audio frames as described above. A recorder 381 records the SDI bitstream without compression of the video. The recorder may be a disc recorder or a tape recorder The SDI bitstream is reproduced from the recorder and a data de-embedder 40 separates the Header Metadata from the video and audio. An MXF file creator 42 maps the Header Metadata into the file header and the video and audio into the file body as shown in FIG. 1. The MXF file may be transferred to the network and/or computer file storage denoted schematically at 46. The MXF file may be transferred from the network and/or storage 46 to a recorder 541, which may be identical to the recorder 381. For that purpose, the MXF file is fed from the network/storage 46 to an SDI encoder which maps the MXF file into an SDI bitstream with repetition of the Header Metadata as described above. The recorder 541 records the SDI bitstream which may be reproduced therefrom and an SDI decoder 60 separates the Header Metadata, the video and the audio.

The invention may be implemented on a digital signal or data processing system which is programmable. Thus the invention may be a computer program product containing instructions which when run on the signal or data processing system implement the invention.

The invention claimed is:

1. A method of combining header metadata with other digital material to form a data file, the method comprising:
structuring the header metadata into a predetermined data structure, the header metadata being associated with the other digital material;
creating a data sequence having a predetermined repetitive format compatible with a data recorder, each repetition of the format including at least one data space for the other digital material and another data space for other data;
padding the header metadata, by null-filling unused data space, to occupy an integer number of frames; and
repetitively including, with a processor, the data structure over a plurality of repetitions of the format so that the header metadata is repetitively distributed through the data file, the data structure being included in the other data space or in part of the data space of the other digital material.

2. A method according to claim 1, wherein the other digital material comprises video material.

3. A method according to claim 2, wherein the at least one data space for the other digital material includes a video data space.

4. A method according to claim 1, wherein the other digital material comprises audio material.

5. A method according to claim 4, wherein the at least one data space for the other digital material includes an audio data space.

6. A method according to claim 5, wherein the header metadata is included in the audio data space.

7. A method according to claim 1, wherein the header metadata is included in the other data space.

8. A method according to claim 1, wherein the other data space is an ancillary data space.

9. A method according to claim 1, wherein the data structure comprises a value field containing the data, a key field, and a length field indicating an amount of data in the value field.

10. A method according to claim 1, wherein the format is repeated in frames, and each repetition of the header metadata in the predetermined data structure begins on a frame containing no data of a previous occurrence of the data structure.

11. A method according to claim 10, wherein each occurrence of the data structures is distributed over an integer number of frames.

12. A method according to claim 11, wherein the repetitive format is that of a Serial Digital Interface (SDI) bitstream.

13. A method according to claim 12, wherein the data structure is repetitively included in audio frames operating in non-audio mode.

14. A method according to claim 13, wherein each set of packets is contained in a window within an audio frame, the window being spaced from boundaries of the frame by guard bands.

15. A method according to claim 13, wherein the data structure is included in a Vertical Ancillary data space (VANC) of the SDI bitstream.

16. A method according to claim 13, wherein the audio frames are contained in an SDTI data structure.

17. A method according to claim 16, wherein the data structure is repetitively included in audio frames operating in non-audio mode in the audio item.

18. A method according to claim 16, wherein the data structure is included in a Vertical Ancillary data space (VANC) within the picture item of the SDTI bitstream.

19. A method according to claim 18, wherein said data structure comprises packets of data, and one set of packets is contained in one line of the Vertical Ancillary data space.

20. A method according to claim 16, wherein the SDTI bitstream comprises a system item and the data structure is included in the system item.

21. A method according to claim 12, further comprising:
creating a Serial Data Transport Interface (SDTI) bitstream from content of the SDI bitstream.

22. A method according to claim 10, wherein the data structure comprises packets of data, and each repetition thereof starts in a packet containing no data of a previous occurrence of the data structure.

23. A method according to claim 22, wherein the packets are ordinally numbered and each repetition of the data structure begins in a packet having a predetermined number.

24. A method according to claim 22, wherein each frame contains a set of packets of the data structure, each set consisting of an integer number of complete packets.

25. A method according to claim 24, wherein each set of packets is contained in a window within an audio frame, the window being spaced from boundaries of the frame by guard bands.

26. A method according to claim 10, wherein the other digital material comprises at least video material, and the repetitive format is that of an SDTI bitstream having at least an audio item and a picture item.

27. A method according to claim 1, wherein a plurality of different data structures having respective identifiers are repetitively distributed in the format.

28. A method according to claim 1, further comprising the step of mapping the header metadata and the other digital material from the repetitive format into the data file in which the data structure is contained in one part of the data file and the other digital material is contained in another part of the data file.

29. A method according to claim 28, wherein the data file comprises a file header, a file body containing the other digital material, and a file footer.

30. A method according to claim 28, wherein the data file is an MXF file.

31. A method according to claim 28, further comprising:
mapping the data structure and the other digital material from the data file into a data sequence having a predetermined repetitive format compatible with a data recorder, each repetition of the format including at least one data space for the other digital material and a data space for other data.

32. The method of claim 1, further comprising:
disposing an index table in the data file, wherein the index table includes information pertaining to a location of the other digital material.

33. A method of forming a data file comprising:
receiving a data sequence including header metadata in a predetermined data structure and other digital material, the data sequence having a predetermined repetitive format compatible with a data recorder, each repetition of the format including at least one data space for the other digital material and a data space for other data;
padding the header metadata, by null-filling unused data space, to occupy an integer number of frames;
repetitively including, with a processor, the data structure over a plurality of repetitions of the format so that the header metadata is repetitively distributed through the data file, the data structure being included in the other data space or in part of the data space of the other digital material, the header metadata being associated with the other digital material; and
separating the data structure from the other digital material.

34. A method according to claim 33, further comprising:
deriving a signal from the data file, into which the data structure and other digital material is mapped, wherein the data structure is contained in one part of the data file and the other digital material is contained in another part of the data file, by inverse mapping the data structure and the other digital material from the data file into the signal.

35. A non-transitory computer readable storage medium encoded with instructions, which when executed by a computer causes the computer to implement steps of a method of combining header metadata with other digital data to form a data file, comprising:
structuring the header metadata into a predetermined data structure, the metadata being associated with the other digital material;
creating a data sequence having a predetermined repetitive format compatible with a data recorder, each repetition of the format including at least one data space for the other digital material and another data space for other data;
padding the header metadata, by null-filling unused data space, to occupy an integer number of frames; and
repetitively including the data structure over a plurality of repetitions of the format so that the header metadata is repetitively distributed through the data file, the data structure being included in the other data space or in part of the data space of the other digital material.

36. A signal processing apparatus for combining header metadata with other digital material to form a data file, comprising:
means for structuring the header metadata into a predetermined data structure, the metadata being associated with the other digital material;
means for creating a data sequence having a predetermined repetitive format compatible with a data recorder, each repetition of the format including at least one data space for the other digital material and another data space for other data;
means for padding the header metadata, by null-filling unused data space, to occupy an integer number of frames; and
means for repetitively including the data structure over a plurality of repetitions of the format so that the header metadata is repetitively distributed through the data file, the data structure being included in the other data space or in part of the data space of the other digital material.

37. A signal processing apparatus for combining header metadata with other digital material to form a data file, comprising:
a structuring unit configured to structure the header metadata into a predetermined data structure, the header metadata being associated with the other digital material;
a data sequence creating unit configured to create a data sequence having a predetermined repetitive format compatible with a data recorder, each repetition of the format including at least one data space for the other digital material and another data space for other data;
a padding unit configured to pad the header metadata, by null-filling unused data space, to occupy an integer number of frames; and
a multiplexer configured to repetitively include the data structure over a plurality of repetitions of the format so that the header metadata is repetitively distributed through the data file, the data structure being included in the other data space or in part of the data space of the other digital material.

38. A method of combining header metadata with other digital material to form a data file, the method comprising:
structuring the header metadata into a predetermined data structure, the header metadata being associated with the other digital material;
creating a data sequence having a predetermined repetitive format compatible with a data recorder, each repetition of the format including at least one data space for the other digital material and another data space for other data;

padding the header metadata, by null-filling unused data space, to occupy an integer number of frames; and repetitively including, with a processor, the data structure over a plurality of repetitions of the format so that the header metadata is repetitively distributed through the data file, the data structure being included in the other data space or in part of the data space of the other digital material, the format being repeated in frames, and each repetition of the data structure begins on a frame containing no data of a previous occurrence of the data structure, and the data structure comprising packets of data, and each repetition of the data structure starts in a packet containing no data of a previous occurrence of the data structure.

39. A method of forming a data file comprising:

receiving a data sequence including header metadata in a predetermined data structure and other digital material, the header metadata being associated with the other digital material, the data sequence having a predetermined repetitive format compatible with a data recorder, each repetition of the format including at least one data space for the other digital material and a data space for other data;

padding the header metadata, by null-filling unused data space, to occupy an integer number of frames;

repetitively including, with a processor, the data structure over a plurality of repetitions of the format so that the header metadata is repetitively distributed through the data file, the data structure being included in the other data space or in part of the data space of the other digital material; and separating the data structure from the other digital material, the format being repeated in frames, and each repetition of the data structure begins on a frame containing no data of a previous occurrence of the data structure, and the data structure comprising packets of data, and each repetition of the data structure starts in a packet containing no data of a previous occurrence of the data structure.

40. A signal processing apparatus for combining header metadata with other digital material to form a data file, comprising:

a structuring unit configured to structure the header metadata into a predetermined data structure, the header metadata being associated with the other digital material;

a data sequence creating unit configured to create a data sequence having a predetermined repetitive format compatible with a data recorder, each repetition of the format including at least one data space for the other digital material and another data space for other data;

a padding unit configured to pad the header metadata, by null-filling unused data space, to occupy an integer number of frames; and a multiplexer configured to repetitively include the data structure over a plurality of repetitions of the format so that the header metadata is repetitively distributed through the data file, the data structure being included in the other data space or in part of the data space of the other digital material, the format being repeated in frames, and each repetition of the data structure begins on a frame containing no data of a previous occurrence of the data structure, and the data structure comprising packets of data, and each repetition of the data structure starts in a packet containing no data of a previous occurrence of the data structure.

41. A non-transitory computer readable storage medium encoded with instructions, which when executed by a computer causes the computer to implement steps of a method of combining header metadata with other digital data to form a data file, comprising:

structuring the header metadata into a predetermined data structure, the header metadata being associated with the other digital material;

creating a data sequence having a predetermined repetitive format compatible with a data recorder, each repetition of the format including at least one data space for the other digital material and another data space for other data;

padding the header metadata, by null-filling unused data space, to occupy an integer number of frames; and repetitively including, with a processor, the data structure over a plurality of repetitions of the format so that the header metadata is repetitively distributed through the data file, the data structure being included in the other data space or in part of the data space of the other digital material, the format being repeated in frames, and each repetition of the data structure begins on a frame containing no data of a previous occurrence of the data structure, and the data structure comprising packets of data, and each repetition of the data structure starts in a packet containing no data of a previous occurrence of the data structure.

* * * * *